(12) United States Patent
Shin

(10) Patent No.: US 8,867,243 B2
(45) Date of Patent: Oct. 21, 2014

(54) DC-DC CONVERTER FOR LIQUID CRYSTAL DISPLAY DEVICE

(75) Inventor: Sungwoo Shin, Gumi-si (KR)

(73) Assignee: LG Display Co., Ltd., Seoul (KR)

( * ) Notice: Subject to any disclaimer, the term of this patent is extended or adjusted under 35 U.S.C. 154(b) by 421 days.

(21) Appl. No.: 13/338,023

(22) Filed: Dec. 27, 2011

(65) Prior Publication Data

US 2012/0169317 A1 Jul. 5, 2012

(30) Foreign Application Priority Data

Dec. 29, 2010 (KR) .................. 10-2010-0137647

(51) Int. Cl.
*H02M 3/07* (2006.01)
*G09G 3/36* (2006.01)

(52) U.S. Cl.
CPC .......... *G09G 3/3696* (2013.01); *G09G 2330/08* (2013.01); *G09G 2330/00* (2013.01); *H02M 3/07* (2013.01)
USPC .............................. 363/60; 323/271; 327/537

(58) Field of Classification Search
USPC ............. 323/222, 271; 327/536, 537; 345/52; 363/59, 60
See application file for complete search history.

(56) References Cited

U.S. PATENT DOCUMENTS

| | | | | |
|---|---|---|---|---|
| 5,606,491 A * | 2/1997 | Ellis | ................................ | 363/60 |
| 6,633,494 B2 * | 10/2003 | Roohparvar et al. | ........... | 363/60 |
| 6,922,097 B2 * | 7/2005 | Chan et al. | ..................... | 327/536 |
| 7,099,166 B2 * | 8/2006 | Kim | ................................ | 363/60 |
| 7,778,055 B2 * | 8/2010 | Trattler | ........................... | 363/59 |
| 7,821,326 B2 * | 10/2010 | Yeh et al. | ....................... | 327/536 |
| 2007/0194834 A1 * | 8/2007 | Sohara et al. | ................. | 327/536 |
| 2010/0176872 A1 * | 7/2010 | Saikusa et al. | ................ | 327/536 |
| 2011/0012671 A1 * | 1/2011 | Chuang et al. | ................ | 327/536 |

FOREIGN PATENT DOCUMENTS

CN 101424795 A 5/2009

OTHER PUBLICATIONS

Office Action issued in corresponding Chinese Patent Application No. 201110448264.X, mailed Dec. 20, 2013, 11 pages.

* cited by examiner

*Primary Examiner* — Fred E Finch, III
(74) *Attorney, Agent, or Firm* — Brinks Gilson & Lione

(57) ABSTRACT

A DC-DC converter of a liquid crystal display (LCD) apparatus is provided comprising a first capacitor connected between a first node and a second node, a second capacitor connected between a third node and a fourth node, and a first diode connected between the input terminal and the first node.

7 Claims, 9 Drawing Sheets

FIG. 6

|  | VG1 | VG2 | VG3 | VG4 | VG5 | VG6 | VG7 | VG8 | C21P | VGH |
|---|---|---|---|---|---|---|---|---|---|---|
| Phase 1 | ON | ON | OFF | OFF | OFF | ON | ON | OFF | AVDD | AVDD |
| Phase 2 | OFF | OFF | ON | ON | ON | OFF | OFF | OFF | AVDD+△1 | AVDD+△3 |
| Phase 3 | ON | ON | OFF | OFF | OFF | ON | ON | OFF | AVDD | AVDD+△4 |
| Phase 4 | OFF | OFF | ON | ON | ON | OFF | OFF | OFF | AVDD+△2 | AVDD+△5 |
| Phase 5 | ON | ON | OFF | OFF | OFF | ON | ON | OFF | AVDD | AVDD+△6 |

US 8,867,243 B2

DC-DC CONVERTER FOR LIQUID CRYSTAL DISPLAY DEVICE

This application claims the priority and the benefit under 35 U.S.C. §119(a) on Patent Application No. 10-2010-0137647 filed in Republic of Korea on Dec. 29, 2010, the entire contents of which are hereby incorporated by reference.

BACKGROUND

1. Field of the Invention

The embodiments of this document are directed to a DC-DC converter for a liquid crystal display (LCD) apparatus, which receives an AVDD voltage to generate a driving voltage for the LCD apparatus.

2. Discussion of the Related Art

Active matrix driving liquid crystal display (LCD) apparatuses display images using thin film transistors (TFTs) as switching elements. LCD apparatuses are swiftly replacing existing cathode ray tube (CRT) displays as displays adopted for various appliances including portable devices, office appliances, computers, TVs, etc., thanks to their advantages, such as being made smaller and more compact.

A DC-DC converter generates driving voltages required for an LCD panel. The driving voltages include positive/negative data voltages, gate high/low voltages VGH and VGL of gate pulses, and a common voltage Vcom. In general, a DC-DC converter boosts a VDD voltage, which is a DC voltage of about 2.8V to about 3.0V, to generate driving voltages for an LCD panel.

Recently, large-size LCD panels are being developed. If a DC-DC converter receiving an existing VDD voltage is used for such a large-size LCD panel, its efficiency is lowered due to a large panel load, so that driving voltages are varied, thereby deteriorating the image quality of the LCD panel. To improve this problem, there has been suggested an attempt to apply a DC-DC converter for an LCD apparatus, which boosts an AVDD voltage of about 6V that is a relatively high external DC voltage. However, as the voltage at the input terminal of the DC-DC converter increases, a parasitic PN junction portion connected to the input terminal becomes conductive so that a current flows through the parasitic PN. Therefore, so-called "latch-up phenomenon" occurs. The latch-up phenomenon becomes severe at a higher temperature circumstance. If the latch-up phenomenon occurs at the DC-DC converter, power consumption is sharply increased and output voltage is fluctuated.

BRIEF SUMMARY

According to an embodiment, there is provided a DC-DC converter of a liquid crystal display (LCD) apparatus, comprising a first capacitor connected between a first node and a second node, a second capacitor connected between a third node and a fourth node, and a first diode connected between the input terminal and the first node.

The DC-DC converter further comprises a second diode connected between the first node and the output terminal.

BRIEF DESCRIPTION OF THE DRAWINGS

The accompanying drawings, which are included to provide a further understanding of the embodiments and are incorporated in and constitute a part of this specification, illustrate embodiments and together with the description serve to explain the principles of the embodiments. In the drawings:

FIG. 6 is a view showing ON/OFF states of the transistors of FIG. 5 for each phase;

DETAILED DESCRIPTION OF THE DRAWINGS AND THE PRESENTLY PREFERRED EMBODIMENTS

Figure 1:
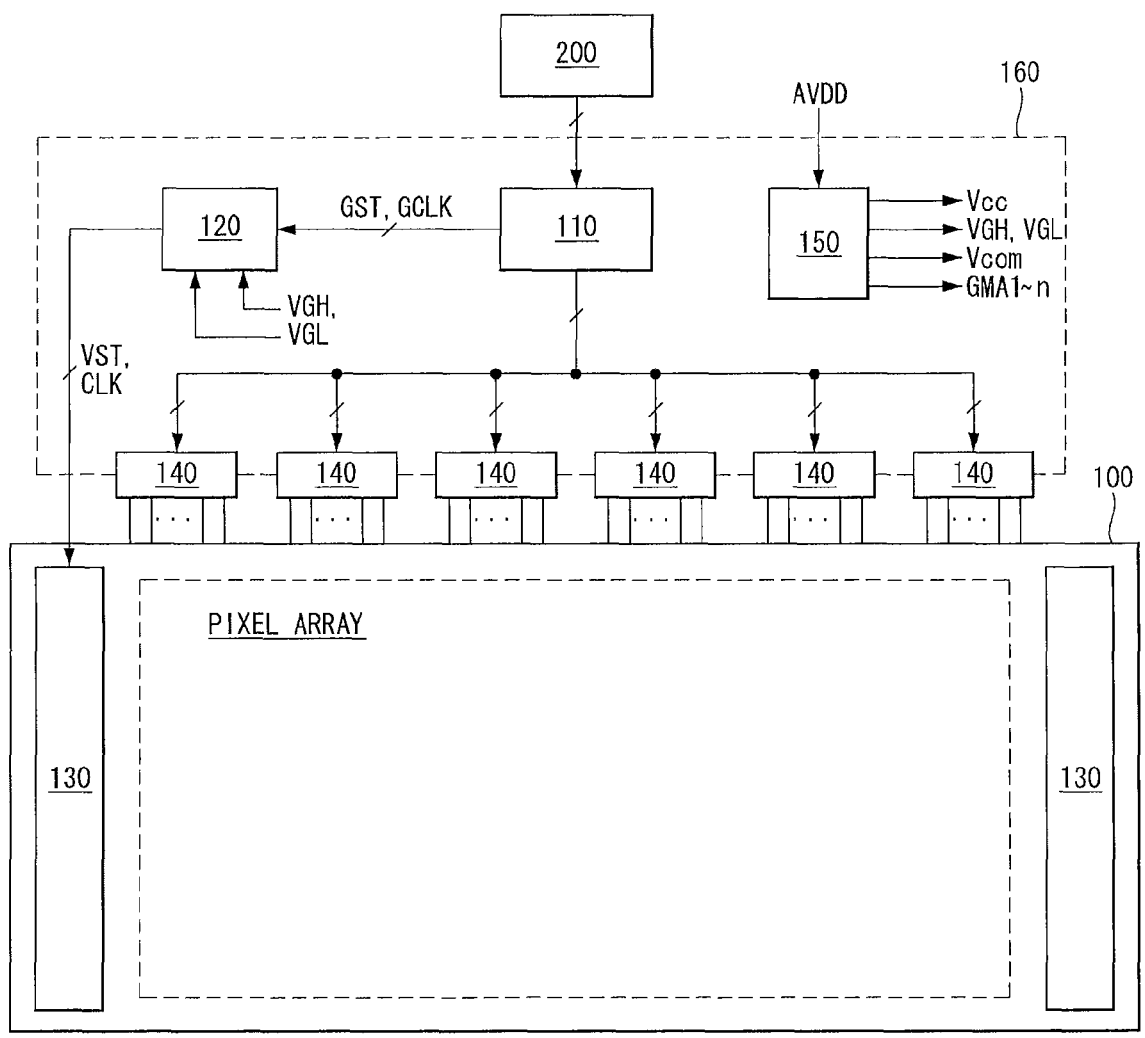
FIG. 1 is a view illustrating an LCD apparatus according to an embodiment.

Hereinafter, exemplary embodiments of this document will be described in greater detail with reference to the accompanying drawings, wherein the same reference numerals may be used to denote the same or substantially the same elements throughout the specification and the drawings. Detailed description on well known functions or configurations deemed to make the gist of this document unclear will be omitted.

Referring to FIG. 1, a liquid crystal display (LCD) apparatus according to an embodiment includes an LCD panel 100, a data driver, a gate driver, a timing controller 110, and a module power circuit 150.

Figure 2:
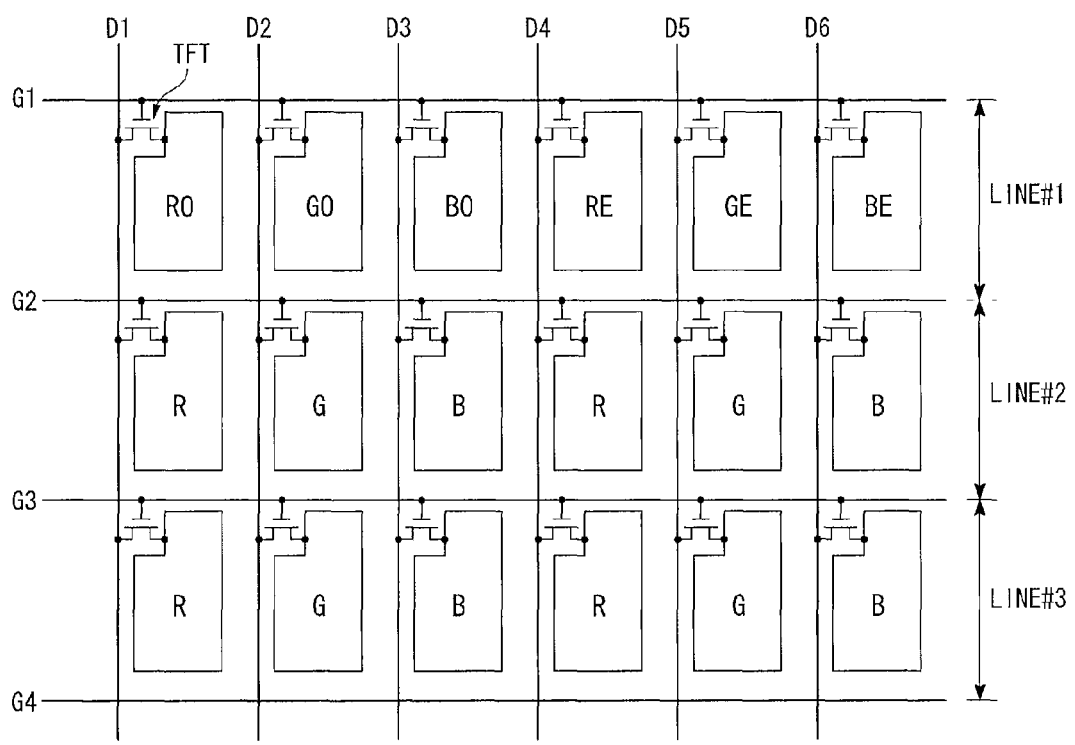
FIGS. 2 to 4 illustrate various exemplary equivalent circuits of a pixel array.
Figure 3:
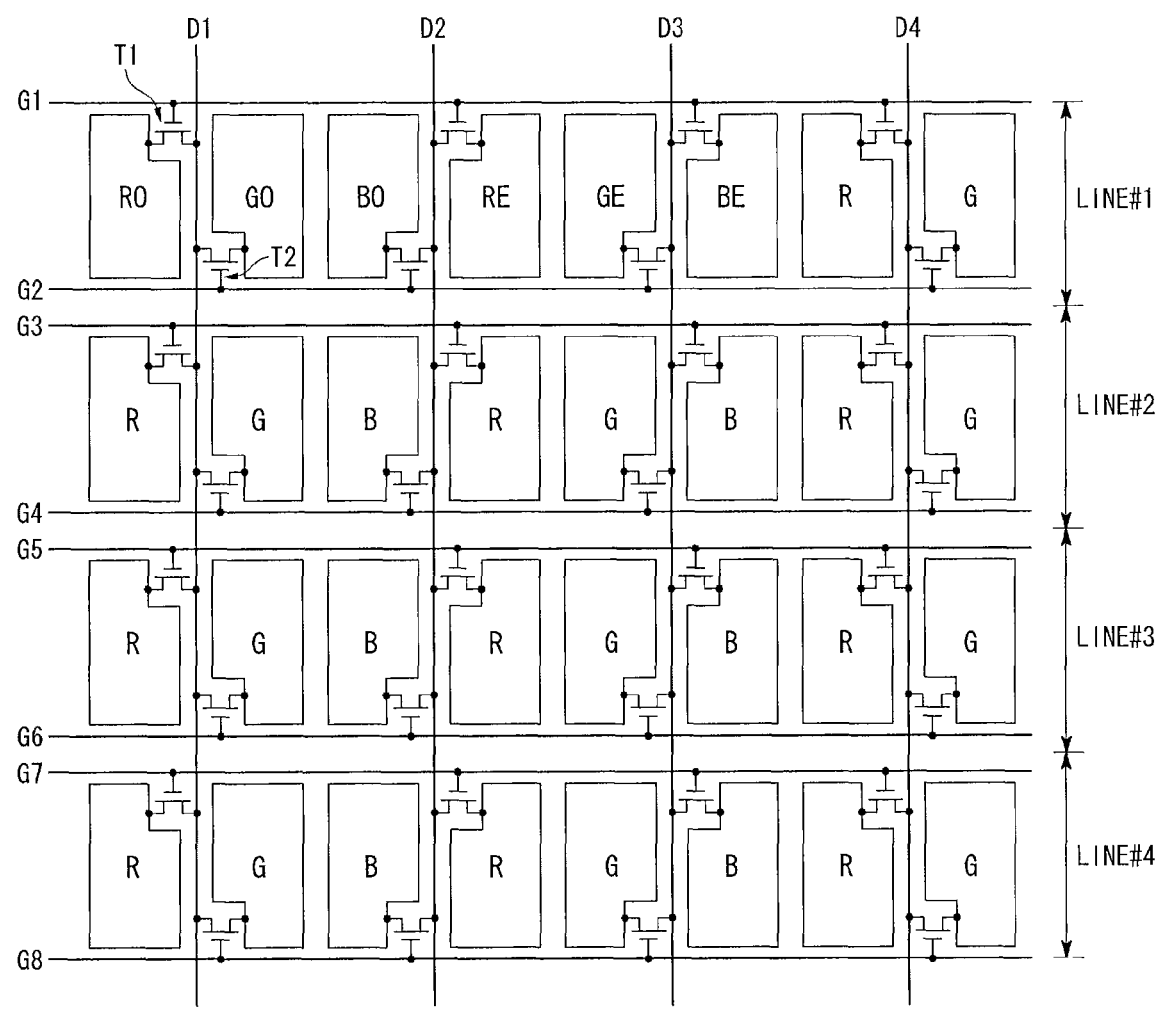
Figure 4:
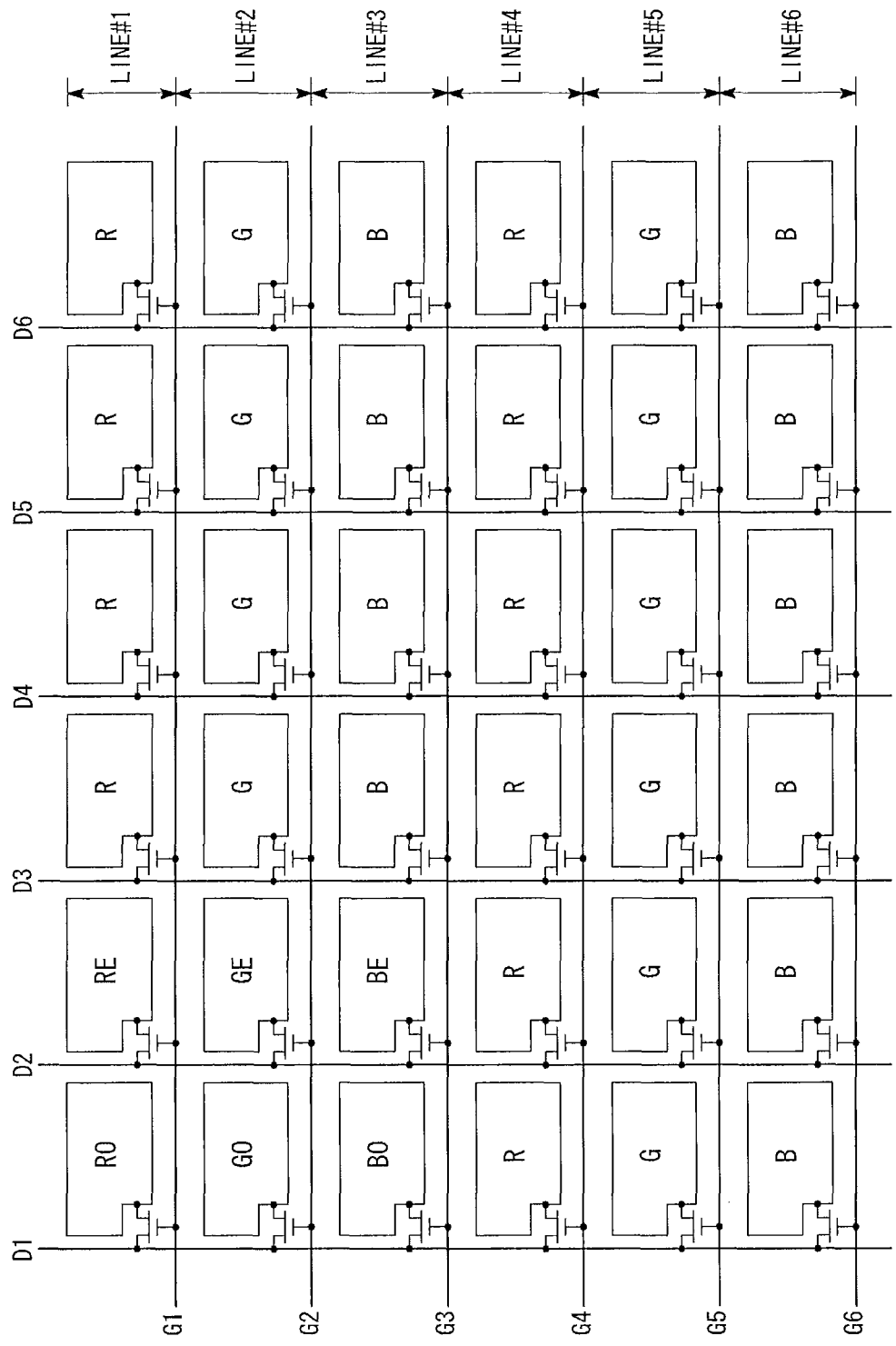

The LCD panel 100 includes a liquid crystal layer formed between upper and lower glass substrates. The LCD panel 100 includes pixels that are arranged in a matrix pattern at intersections of gate lines and data lines. A pixel array of the LCD panel includes a TFT array and a color filter array that are implemented in various structures as shown in FIGS. 2 to 4. The TFT array substrate of the LCD panel 100 includes data lines, gate lines crossing the data lines, TFTs (Thin Film Transistors) formed at intersections of the data and gate lines, pixel electrodes of liquid crystal cells, and storage capacitors Cst connected to the pixel electrodes, respectively. The liquid crystal molecules in the pixels are driven by electric fields applied between the pixels electrodes connected to the TFTs and a common electrode. The color filter array substrate of the LCD panel 100 includes black matrixes, color filters, and the common electrode. A polarization film is attached onto each of the upper and lower glass substrates. Also, an alignment film is attached onto each of the upper and lower glass substrates to set a pre-tilt angle of the liquid crystal molecules.

The LCD apparatus can be implemented in a vertical electric field driving mode, such as a TN (Twisted Nematic) mode and VA (Vertical Alignment) mode, or in a horizontal electric field driving mode, such as an IPS (In Plane Switching) mode and FFS (Fringe Field Switching) mode. The LCD apparatus can be implemented as a transmissive LCD, transflective LCD, and reflective LCD apparatus. The transmissive LCD or transflective LCD apparatus requires a backlight unit. The backlight unit can be implemented as a direct-type backlight unit or edge-type backlight unit.

The data driver includes a plurality of source drive ICs 140. The source drive ICs 140 latch digital video data input from the timing controller 110 under control of the timing controller 110. Then, the source drive ICs 140 convert the digital video data into positive/negative gamma reference voltages GMA1 to GMAn to generate positive/negative data voltages. The positive/negative data voltages output from the source drive ICs 140 are supplied to the data lines of the LCD panel. The source drive ICs 140 are connected to the data lines of the LCD panel 100 by a COG (Chip On Glass) process or TAB (Tape Automated Bonding) process.

The gate driver includes a level shifter 120 and a shift register 130, and sequentially supplies gate pulses to the gate lines under control of the timing controller 110. The gate pulses swing between a gate high voltage VGH and a gate low voltage VGL.

The level shifter 120 divides gate shift clocks input from the timing controller 110 by N (N is an integer not less than 2) and outputs N-phase clock signals. The level shifter 120 shifts TTL (Transistor-Transistor-Logic) voltage level of a gate start pulse GST and the N-phase clock signals input from the timing controller 110 to the gate high voltage VGH and gate low voltage VGL. The gate high voltage VGH and gate low voltage VGL are set as operation voltages of the TFTs formed in the pixel array of the LCD panel 100 and the shift register 130. The shift register 130 includes a plurality of phases connected to each other in cascade. The shift register 130 is formed on the TFT array substrate together with the pixel array by a GIP (Gate In Panel) process. The shift register 130 sequentially supplies gate pulses to the gate lines.

The timing controller 110 rearranges digital video data input from a host system 200 and supplies the rearranged digital video data to the source drive ICs 140. The timing controller 110 generates gate timing control signals for controlling operation timing of the level shifter 120 and source timing control signals for controlling operation timing of the source drive ICs 140 based on timing signals input from the host system 200, such as a vertical sync signal Vsync, a horizontal sync signal Hsync, a data enable signal DE, or a dot clock CLK.

The host system 200 includes a graphic processing circuit, such as a scaler, which interpolates the resolution of RGB video data input from an external video source (not shown) or a broadcast receiving circuit (not shown) to comply with the resolution of the LCD panel 100 and performs a signal interpolation process, and a power circuit that generates an input voltage Vin to be supplied to the power circuit 150. The host system 200 supplies input image data to the timing controller 110 and the timing signals Vsync, Hsync, DE, and CLK to the timing controller 110 through an interface, such as an LVDS (Low Voltage Differential Signaling) interface or TMDS (Transition Minimized Differential Signaling) interface.

The power circuit 150 receives AVDD of about 6V and boosts the AVDD using a DC-DC converter and regulator to output a logic power voltage Vcc and driving voltages of the LCD panel 100, such as VGH, VGL, Vcom, and GMA1 to GMAn. The logic power voltage VCC, about 3.3V, is input to power the driver ICs of the LCD panel. The gate high voltage VGH is more than 15V, and the gate low voltage VGL is less than −5V. The gate high voltage VGH and the gate low voltage VGL are output through a DC-DC converter shown in FIG. 5. The common voltage, which is a voltage between 7V and 9V, is supplied to the common electrode of the LCD panel 100. The positive/negative gamma reference voltages GMA1 to GMAn are divided by a voltage dividing circuit and input to the source drive ICs 140. The positive/negative gamma reference voltages GMA1 to GMAn include positive gamma reference voltages higher than the common voltage Vcom and negative gamma reference voltages lower than the common voltage Vcom.

FIGS. 2 to 4 illustrate various exemplary equivalent circuits of a pixel array. Referring to FIGS. 2 to 4, D1 to D6 refer to data lines, and G1 to G8 refer to gate lines.

In the pixel array shown in FIG. 2, one pixel includes a red sub-pixel R, a green sub-pixel G, and a blue sub-pixel G that are sequentially arranged in a line direction (or row direction) perpendicular to a column direction. Red sub-pixels R are arranged along the column direction. Green sub-pixels G are arranged along the column direction, and blue sub-pixels B are arranged along the column direction.

In the pixel array of FIG. 2, the TFTs supply data voltages from the data lines D1 to D6 to pixel electrodes arranged at left sides (or right sides) of the data lines D1 to D6 in response to the gate pulses from the gate lines G1 to G4. When the resolution of the pixel array is m×n (m and n is each an integer not less than 2), the pixel array as illustrated in FIG. 2 requires m×3 (where, '3' refers to R, G, and B) data lines and n gate lines.

In the pixel array shown in FIG. 3, the number of data lines required for the same resolution as the pixel array of FIG. 2 can be reduced by ½ compared to the pixel array of FIG. 2, and the number of necessary source drive ICs can be also reduced by ½. The frequency of data voltages supplied to the data lines D1 to D4 of the pixel array shown in FIG. 3 is two times higher than the frequency of data voltages supplied to the data lines of the pixel array shown in FIG. 2. When the resolution of pixel array shown in FIG. 3 is m×n, {m×3 (where, '3' refers to R, G, and B)}/2 data lines and 2n gate lines.

In the pixel array illustrated in FIG. 3, one pixel includes a red sub-pixel R, a green sub-pixel G, and a blue sub-pixel G that are sequentially arranged along the line direction perpendicular to the column direction. In the present pixel array, red sub-pixels R are arranged along the column direction, green sub-pixels G are arranged along the column direction, and blue sub-pixels B are arranged along the column direction. In this pixel array, sub-pixels opposite to each other in the left-and-right direction share the same data line and are sequentially charged with data voltages supplied through the shared data line in a time-division manner. For purposes of illustration, sub-pixels and TFTs arranged at the left sides of the data lines D1 to D4 are referred to as first liquid crystal cells and first TFTs T1, respectively, and sub-pixels and TFTs arranged at the right sides of the data lines D1 to D4 are referred to as second liquid crystal cells and second TFTs T1, respectively. The first TFTs T1 supply data voltages from the data lines D1 to D4 to the pixel electrodes of the first liquid crystal cells in response to gate pulses from odd-numbered gate lines G1, G3, G5, and G7. Gate electrodes of the first TFTs T1 are connected to the odd-numbered gate lines G1, G3, G5, and G7, and drain electrodes of the first TFTs T1 are connected to the data lines D1 to D4. Source electrodes of the first TFTs T1 are connected to the pixel electrodes of the first liquid crystal cells. The second TFTs T2 supply data voltages from the data lines D1 to D4 to the pixel electrodes of the second liquid crystal cells in response to gate pulses from even-numbered gate lines G2, G4, G6, and G8. Gate electrodes of the second TFTs T2 are connected to the even-numbered gate lines G2, G4, G6, and G8, and drain electrodes of the second TFTs T2 are connected to the data lines D1 to D4. Source electrodes of the second TFTs T2 are connected to the pixel electrodes of the second liquid crystal cells.

In the pixel array shown in FIG. 4, the number of data lines required for the same resolution as the pixel array shown in FIG. 2 can be reduced by ⅓ and the number of necessary source drive ICs can be reduced by ⅓ compared to the pixel array shown in FIG. 2. When the resolution of the pixel array of FIG. 4 is m×n, m data lines and 3n gate lines are needed.

In the pixel array shown in FIG. 4, one pixel includes a red sub-pixel R, a green sub-pixel G, and a blue sub-pixel B that are sequentially arranged along the column direction. Red sub-pixels R are arranged along the line direction, green sub-pixels G are arranged along the line direction, and blue sub-pixels B are arranged along the line direction. The TFTs supply data voltages from the data lines D1 to D6 to pixel electrodes of liquid crystal cells arranged at left sides (or right sides) of the data lines D1 to D6 in response to gate pulses from the gate lines G1 to G6.

Referring to FIGS. 2 to 4, "RO", "GO", and "BO" refer to a red, green, and blue sub-pixels of an odd-numbered pixel of pixels arranged along the line direction in the pixel array (refer to FIGS. 2 and 3) or along the column direction in the pixel array (refer to FIG. 4). "RE", "GE", and "BE" refer to a red, green, and blue sub-pixels of an even-numbered pixel of pixels arranged along the line direction in the pixel array or along the column direction in the pixel array.

Figure 5:
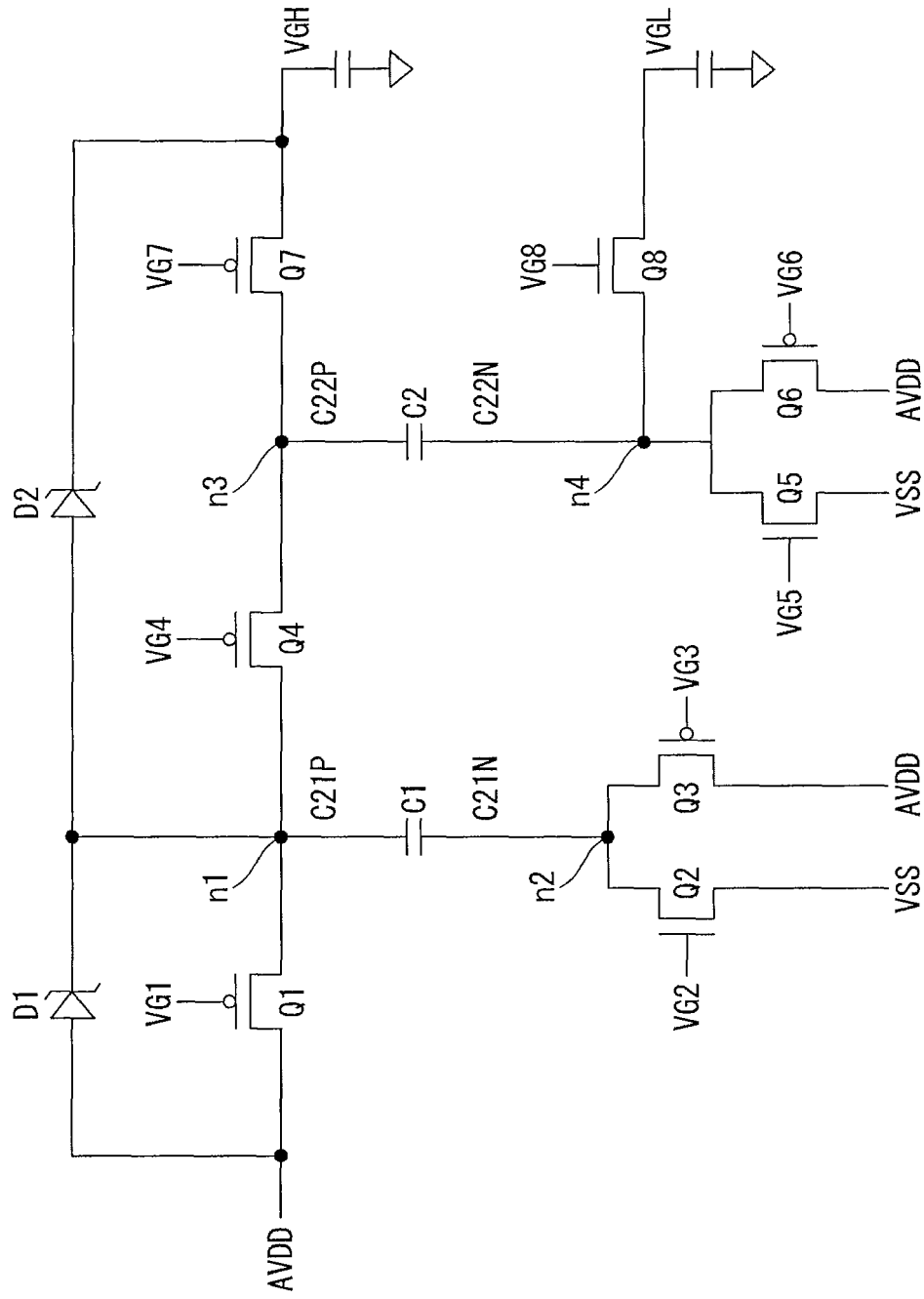
FIG. 5 is a circuit diagram illustrating a DC-DC converter according to an embodiment.
Figure 7:
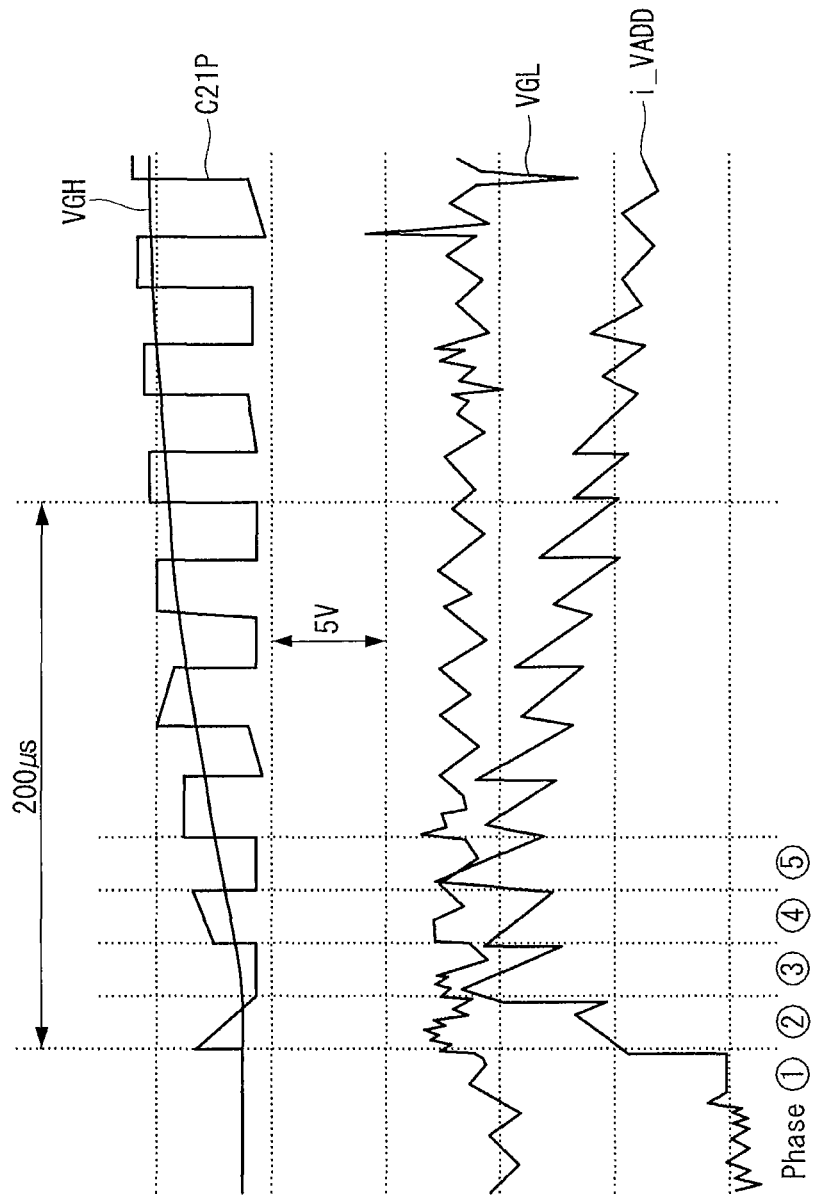
FIG. 7 illustrates waveforms of the first node voltage C21P, the gate high voltage gate low voltage VGL, and the AVDD input terminal current i_AVDD of the DC-DC converter shown in FIG. 5 for each phase.

FIG. 5 is a circuit diagram illustrating a DC-DC converter according to an embodiment. FIG. 6 is a view showing ON/OFF states of the transistors of FIG. 5 for each phase. FIG. 7 illustrates waveforms of the first node voltage C21P, the gate high voltage gate low voltage VGL, and the AVDD input terminal current i_AVDD of the DC-DC converter shown in FIG. 5 for each phase.

Referring to FIGS. 5 to 7, the DC-DC converter is implemented as a CMOS IC (Complementary Metal Oxide Semiconductor IC) package. The DC-DC converter includes a first TFT Q1 connected between an AVDD input terminal and a first node n1, a first capacitor C1 connected between the first node n1 and a second node n2, a second transistor Q2 connected between the second node n2 and a base voltage source VSS, a third transistor Q3 connected between the second node n2 and AVDD input terminal, a fourth transistor Q4 connected between the first node n1 and a third node n3, a second capacitor C2 connected between the third node n3 and a fourth node n4, a fifth transistor Q5 connected between the fourth node n4 and the base voltage source VSS, a sixth transistor Q6 connected between the fourth node n4 and AVDD input terminal, a seventh transistor Q7 connected between the third node n3 and a VGH output terminal, an eighth transistor Q8 connected between the fourth node n4 and VGL output terminal, a first diode D1 connected between the AVDD input terminal and first node n1, and a second diode D2 connected between the first node n1 and VGH output terminal.

The first, third, fourth, sixth, and seventh transistors Q1, Q3, Q4, Q6, and Q7 are implemented as p-type MOSFETs (Metal Oxide Semiconductor FET), and the second, fifth, and eighth transistors Q2, Q5, and Q8 are implemented as n-type MOSFETs.

In FIG. 5, "C21P" refers to a voltage of the first node n1, "C21N" to a voltage of the second node n2, and "C22P" to a voltage of the third node n3. "C22N" refers to a voltage of the fourth node n4.

Gate voltages VG1 to VG8 respectively applied to gate electrodes of the transistors Q1 to Q8 are generated from a DC-DC converter control logic (not shown). The DC-DC converter control logic generates the gate voltages VG1 to VG8 as shown in FIG. 6, thereby controlling the operation of the DC-DC converter on a per-phase basis. The gate high voltage VGH is boosted for a predetermined time period from an initial time that the AVDD voltage is input to the DC-DC converter as shown in FIG. 7.

The first and second transistors Q1 and Q2 are simultaneously turned on at Phase 1, Phase 3, and Phase 5 in response to the gate voltages VG1 and VG2, and supply the AVDD voltage to the first node n1 to charge the first capacitor C1. The gate electrode of the first transistor Q1 is supplied with the first gate voltage VG1. The source electrode of the first transistor Q1 is connected to the AVDD input terminal, and the drain electrode of the first transistor Q1 is connected to the first node n1. The gate electrode of the second transistor Q2 is supplied to the second gate voltage VG2. The source and drain electrodes of the second transistor Q2 are connected to the base voltage source VSS and the second node n2, respectively.

The third to fifth transistors Q3, Q4, and Q5 are simultaneously turned on at Phase 2 and Phase 4 in response to the gate voltages VG3, VG4, and VG5 and supply the AVDD voltage to the second node n2 to boost the first node voltage C21P, then supply the boosted first node voltage C21P to the third node n3 to charge the second capacitor C2. The gate electrode of the third transistor Q3 is supplied with the third gate voltage VG3. The source and drain electrodes of the third transistor Q3 are connected to the AVDD input terminal and the second node n2, respectively. The gate electrode of the fourth transistor Q4 is supplied with the fourth gate voltage VG4. The source and drain electrodes of the fourth transistor Q4 are connected to the first node n1 and the third node n3, respectively. The gate electrode of the fifth transistor Q5 is supplied with the fifth gate voltage VG5. The source and drain electrodes of the fifth transistor Q5 are connected to the base voltage source VSS and the fourth node n4, respectively.

The sixth and seventh transistors Q6 and Q7 are simultaneously turned on at Phase 1, Phase 3, and Phase 5 in response to the gate voltages VG6 and VG7, and supply the AVDD voltage to the fourth node n4 to boost the third node voltage C22P, then supplying the boosted third node voltage C22P to the VGH output terminal. The gate electrode of the sixth transistor Q6 is supplied with the sixth gate voltage VG6. The source and drain electrodes of the sixth transistor Q6 are connected to the AVDD input terminal and the fourth node n4, respectively. The gate electrode of the seventh transistor Q7 is supplied with the seventh gate voltage VG7. The source and drain electrodes of the seventh transistor Q7 are connected to the third node n3 and the VGH output terminal, respectively.

The eighth transistor Q8 maintains the OFF state during Phases 1 to 5. After Phase 5, the eighth transistor Q8 is turned on to supply the fourth node voltage C22N to the VGL output terminal as the gate low voltage VGL. The gate electrode of the eighth transistor Q8 is supplied with the eighth gate voltage VG8. The source and drain electrodes of the eighth transistor Q8 are connected to the VGL output terminal and the fourth node n4, respectively.

As shown in FIG. 7, the first node voltage C21P is charged to AVDD at Phase 1, raised up to AVDD+Δ1 at Phase 2, dropped to AVDD at Phase 3, raised up to AVDD+Δ2 at Phase 4, and then dropped to AVDD at Phase 5. As shown in FIG. 7, the gate high voltage VGH is sequentially raised to AVDD at Phase 1, to AVDD+Δ3 at Phase 2, to AVDD+Δ4 at Phase 3, to AVDD+Δ5 at Phase 4, and then to AVDD+Δ6 at Phase 5.

Figure 8:
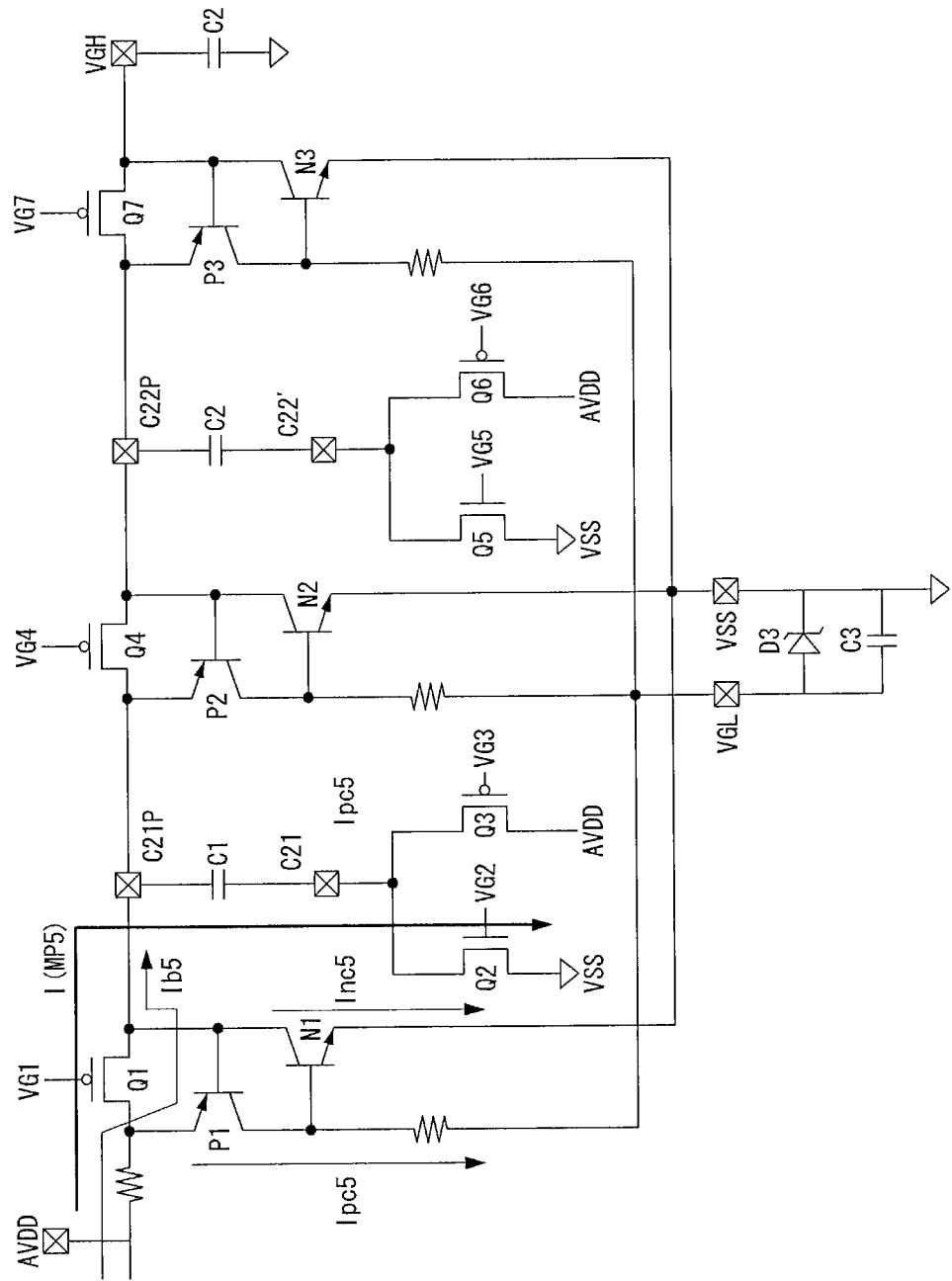
FIG. 8 is a circuit diagram illustrating a charging path of the first capacitor of FIG. 5 and a latch-up current path going through parasitic BJTs connected to the first transistor of FIG. 5.

The first node voltage C21P is charged with a current I (MP5) that flows via the first transistor Q1 to the first node n1 at Phases 1, 3, and 5 as shown in FIG. 8 and a current Ib5 that flows through the emitter and base of a parasitic PNP-type BJT (Bipolar Junction Transistor) P1 connected to the first transistor Q1. The second node voltage C22P is charged with a current indicated with a thick solid line as shown in FIG. 8 at Phases 2 and 4.

The anode and cathode of the first diode D1 are connected to the AVDD input terminal and the first node n1, respectively. The first diode D1 may be selected as a Zener diode. When a voltage difference between the voltage of the AVDD input terminal and the first node voltage C21P increases to more than a threshold voltage Vth, the first diode D1 is turned on to adjust the first node voltage C21P to ADD-Vth, thereby preventing a latch-up phenomenon.

Absent from the first diode D1, a latch-up phenomenon occurs in which the voltage at the AVDD input terminal is latched up by currents Ipc5 and Inc5 flowing through the parasitic BJTs P1 and N1 connected to the first transistor Q1 to the base voltage source VSS as shown in FIG. 8. A condition for latch-up is (AVDD-0.7)>C21P, where "0.7V" is a threshold voltage of the BJTs P1 and N1 connected to the first transistor Q1. The first diode D1 is turned on before the latch-up condition, {(AVDD−0.7V)>C21P}, is met, thereby preventing a current from flowing through the parasitic BJTs P1 and N1 connected to the first transistor Q1, i.e., preventing the latch-up phenomenon.

The anode and cathode of the second diode D2 are connected to the first node n1 and the VGH output terminal, respectively. The second diode D2 may be selected as a Zener diode. The second diode D2 is turned on when a voltage difference between the first node voltage C21P and the gate high voltage output through the VGH output terminal is increased to more than a threshold voltage Vth to adjust the gate high voltage VGH to C21P-Vth, thereby preventing a latch-up phenomenon. Here, "C21P" is equal to 2×AVDD at Phase 2.

Figure 9:
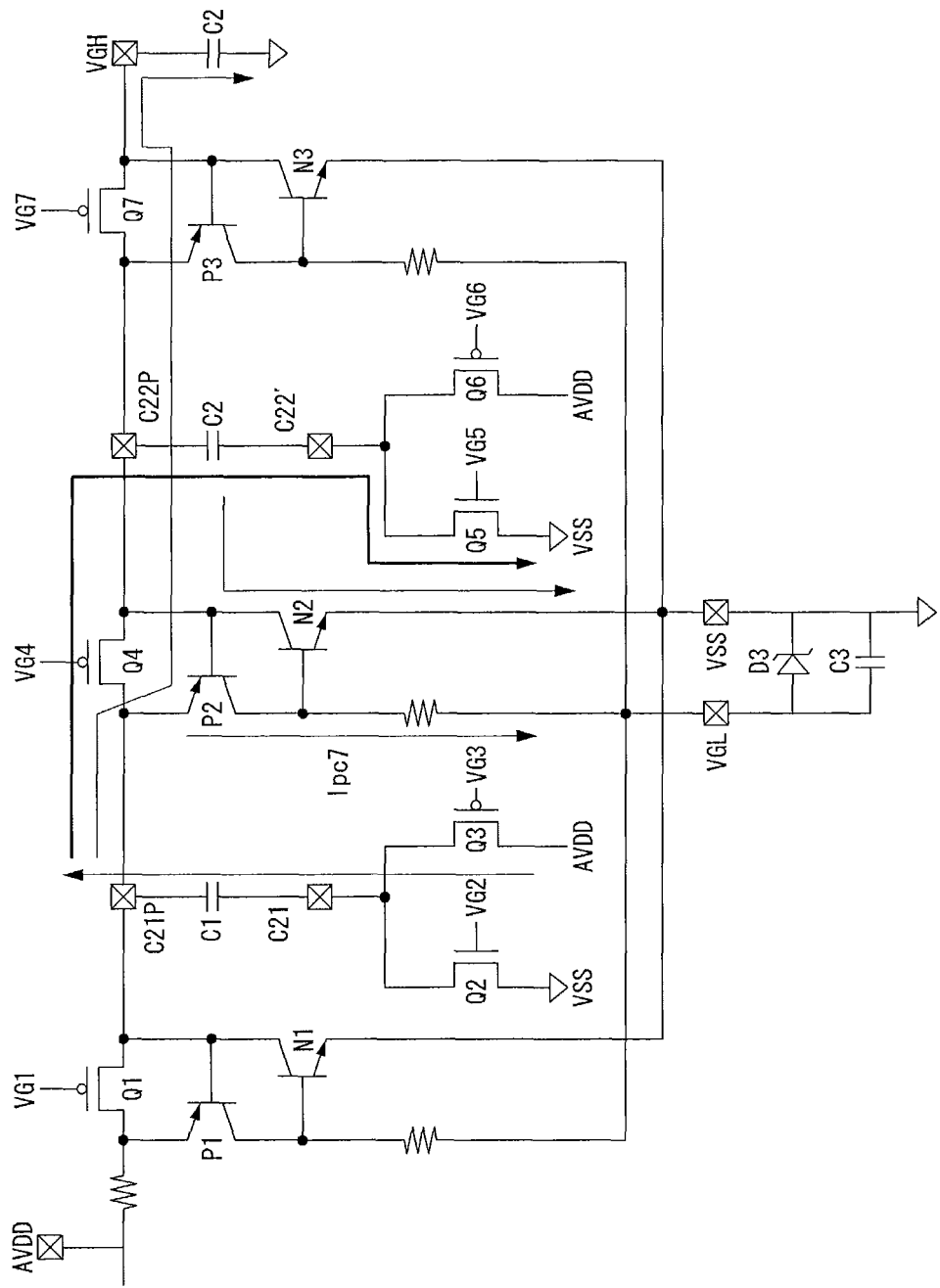
FIG. 9 is a circuit diagram illustrating a charging path of the second capacitor of FIG. 5 and a latch-up current path going through parasitic BJTs connected to the fourth transistor of FIG. 5.

Without the second diode D2, a latch-up phenomenon is created by currents Ipc5 and Inc5 flowing through the parasitic BJTs P2 and N2 connected to the fourth transistor Q4 to the base voltage source VSS when the latch-up condition, (C21P−0.7V)>VGH, is satisfied as shown in FIG. 9. Here, "0.7V" refers to a threshold voltage of the BJTs P2 and N2 connected to the first transistor Q1. The second diode D2 is turned on before the latch-up condition, {(AVDD−0.7V)> C21P}, is met to prevent the latch-up phenomenon in which current flows through the parasitic BJTs P2 and N2 connected to the fourth transistor Q4.

As shown in FIGS. 8 and 9, the DC-DC converter further includes a third diode D3 and a third capacitor C3 connected in parallel with each other between the VGL output terminal and the base voltage source VSS.

As described above, the embodiments of this document has diodes connected between the input and output terminals of the DC-DC converter, thereby preventing a latch-up phenomenon from occurring in the DC-DC converter. As a consequence, reliability of the DC-DC converter can be enhanced.

Although embodiments have been described with reference to a number of illustrative embodiments thereof, it should be understood that numerous other modifications and embodiments can be devised by those skilled in the art that will fall within the scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

The invention claimed is:

1. A DC-DC converter of a liquid crystal display (LCD) apparatus, which boosts a DC voltage input through an input terminal using a plurality of transistors and capacitors to generate a driving voltage for the LCD apparatus and outputs the driving voltage through an output terminal, the DC-DC converter comprising:
   a first capacitor connected between a first node and a second node;
   a second capacitor connected between a third node and a fourth node;
   a first external diode connected between the input terminal and the first node;
   a second external diode connected between the first node and the output terminal;
   a first transistor connected between the input terminal and the first node;
   a second transistor connected between a base voltage source and the second node;
   a third transistor connected between the input terminal and the second node;
   a fourth transistor connected between the first node and the third node; and
   a fifth transistor connected between the base voltage source and the fourth node,
   wherein the DC voltage is a voltage of 6V.

2. The DC-DC converter of claim 1, wherein the first external diode comprises an anode connected to the input terminal and a cathode connected to the first node.

3. The DC-DC converter of claim 1, wherein the second external diode comprises an anode connected to the first node and a cathode connected to the output terminal.

4. The DC-DC converter of claim 1, wherein the driving voltage includes a gate high voltage supplied to gate lines of the LCD apparatus.

5. The DC-DC converter of claim 1, wherein the transistors comprise,
   the first transistor comprising a gate electrode supplied with a first gate voltage, a source electrode connected to the input terminal, and a drain electrode connected to the first node,
   the second transistor comprising a gate electrode supplied with a second gate voltage, a source electrode connected to a base voltage source, and a drain electrode connected to the second node,
   the third transistor comprising a gate electrode supplied with a third gate voltage, a source electrode connected to the input terminal, and a drain electrode connected to the second node,
   the fourth transistor comprising a gate electrode supplied with a fourth gate voltage, a source electrode connected to the first node, and a drain electrode connected to the third node, and
   the fifth transistor comprising a gate electrode supplied with a fifth gate voltage, a source electrode connected to the base voltage source, and a drain electrode connected to the fourth node, wherein the first and second transistors are turned on at first, third, and fifth phases in response to the first and second gate voltages to charge the first node, and the third to fifth transistors are turned on at second phase between the first and third phases and at fourth phase between the third and fifth phases in response to the third to fifth gate voltages to boost a voltage of the first node and supply the boosted voltage to the second node.

6. The DC-DC converter of clam 5, wherein the transistors further comprise, a sixth transistor comprising a gate electrode supplied with a sixth gate voltage, a source electrode connected to the input terminal, and a drain electrode connected to the fourth node, and a seventh transistor comprising a gate electrode supplied with a seventh gate voltage, a source electrode connected to the third node, and a drain electrode connected to the output terminal, wherein the sixth and seventh transistors are turned on at the first, third, and fifth phases in response to the sixth and seventh gate voltages to boost a voltage of the second node and supply the boosted voltage to the output terminal.

7. The DC-DC converter of claim 6, wherein the transistors further comprise an eighth transistor comprising a gate electrode supplied with an eighth gate voltage, a source electrode connected to a second output terminal, and a drain electrode connected to the fourth node, wherein the eighth transistor maintains an OFF state at the first to fifth phases and is turned on after the fifth phase in response to the eighth gate voltage to supply a voltage of the fourth node to the second output terminal as a gate low voltage supplied to gate lines.

* * * * *